UNITED STATES PATENT OFFICE.

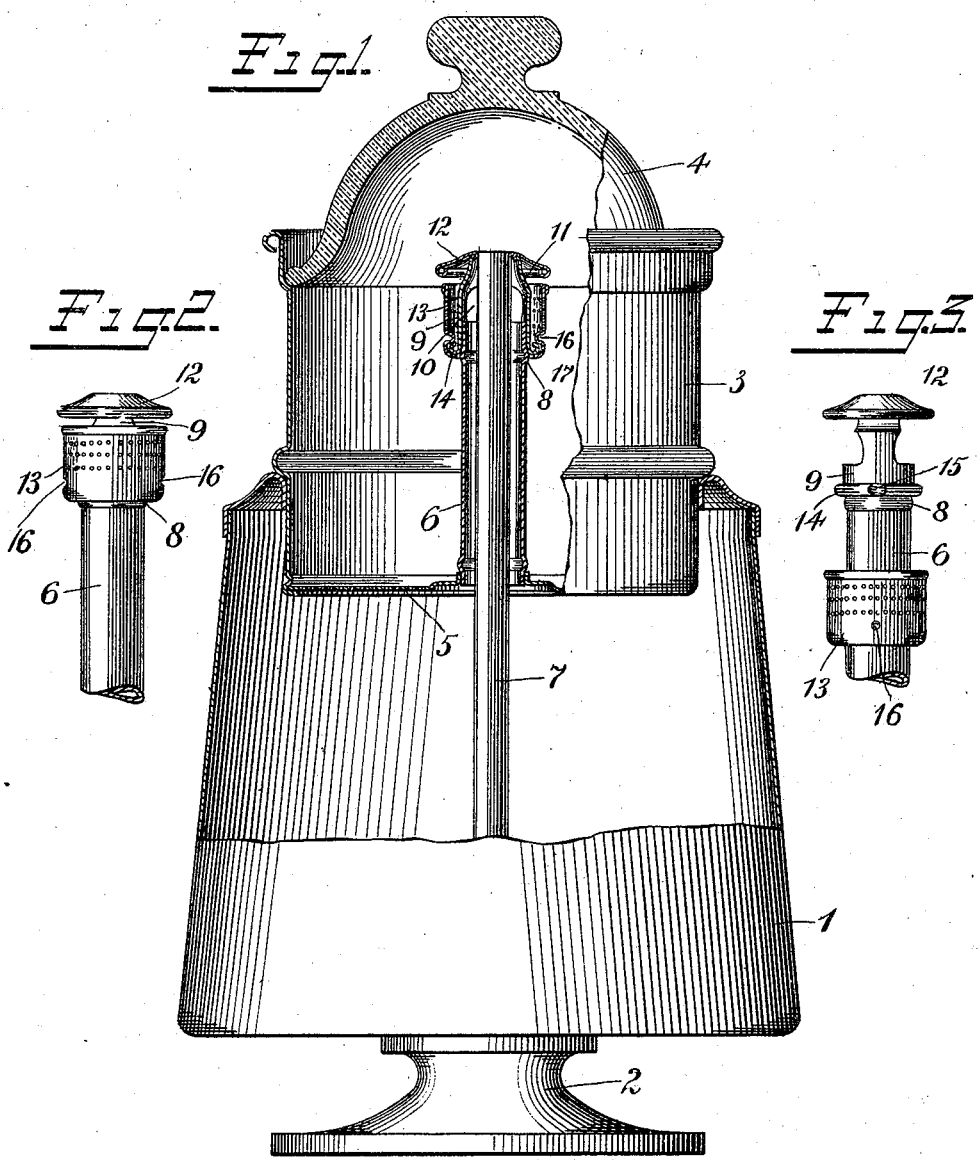

JAMES W. CHAPMAN, OF MERIDEN, CONNECTICUT, ASSIGNOR TO MANNING, BOWMAN & COMPANY, OF MERIDEN, CONNECTICUT, A CORPORATION OF CONNECTICUT.

PERCOLATOR-POT.

966,735.  Specification of Letters Patent.  Patented Aug. 9, 1910.

Application filed March 15, 1910. Serial No. 549,402.

*To all whom it may concern:*

Be it known that I, JAMES W. CHAPMAN, a citizen of the United States, residing at Meriden, county of Hartford, State of Connecticut, have invented certain new and useful Improvements in Percolator-Pots, of which the following is a full, clear, and exact description.

My invention relates to percolator pots, and is particularly concerned with improvements in an overflow device for carrying off surplus liquid from the coffee container.

The invention is particularly applicable to containers with which no perforated retainer overlying the coffee is used.

The object of the invention is to provide a construction which, while taking care of the surplus liquid, also serves to prevent the coffee grounds when being poured into the container from entering the overflow tube, and thus passing down into the main body of the pot.

With these objects in view, the invention consists in the construction and arrangements of parts, a preferred embodiment of which is illustrated in the accompanying drawings, in which—

Figure 1 is a vertical elevation, partly in section, of a percolator pot showing my improvements. Fig. 2 is a detail view of the overflow mechanism detached, showing the parts in normal operative position. Fig. 3 is a view similar to Fig. 2, showing the perforated screen which protects the overflow tube displaced to facilitate cleaning.

In the embodiment of my invention herein selected for illustration, 1 indicates the main body of the pot, which is provided with a heating chamber 2 and a removable coffee container 3, the latter having the usual glass cover 4. From the perforated bottom 5 of the container projects upwardly an overflow tube 6, which, when the parts are assembled for operation, surrounds the percolator tube 7. The upper end of the overflow tube 6 is provided with a shoulder 8, adapted to support a removable tubular member 9, the latter having lateral openings 10 to afford communication between the container and the overflow tube 6, by which surplus liquid in the container may flow back into the main body of the pot. The upper end of the tubular member 9 is contracted at 11, and closely engages the extreme upper end of the percolator tube. This tubular member, furthermore, is provided with an annular deflector plate 12, by which the liquid issuing from the percolator tube is distributed over the surface of the coffee.

13 indicates a short circular screen, which, when in normal position, surrounds the upper end of the overflow tube and incloses the overflow openings 10 in the tubular member 9. This screen serves to prevent any of the coffee grounds from passing into the overflow tube 6 through the apertures 10 with the overflow of surplus liquid. Said screen also, in conjunction with the overlying deflecting plate 12, prevents the grounds, when poured into the container, from entering the overflow apertures 10.

In order to facilitate the cleaning of the parts, the screen 13 is removably attached to the tubular member 9. With this object in view, the lower end of the tubular member is provided with a beading 14 notched at its opposite sides, as indicated at 15, Fig. 3, and the screen is provided with oppositely arranged indentations 16, which rest upon the beading 14 when the parts are in operative position, but which may be brought into register with the notches 15, and the screen thus removed from the tubular member. The lower edge of the screen also is provided with an inturned rim 17, which engages beneath the beading 14 and maintains the upper edge of the screen spaced away from the deflecting plate 12, thus leaving a space between said parts for overflow of liquid in excess of that which can be taken care of by the perforations in the screen.

In cleaning the device, the tubular member 9 may be retained upon the overflow tube 6, and the screen simply slipped down the overflow tube free of the tubular member indicated in Fig. 3, or both tubular member and screen may be removed from the overflow tube and separated as described.

While I have herein described a particular embodiment of my invention, it is to be understood that the same may be altered in details and in arrangement of parts within the scope of the appended claims.

What I claim is:

1. In a percolator pot, the combination with a main pot having a heating chamber and a percolator tube extending upwardly from said heating chamber, of a coffee container having an overflow tube arranged to surround said percolator tube when the parts are assembled, and a screen separate from said overflow tube surrounding the upper end thereof, and removably supported adjacent thereto.

2. In a percolator pot, the combination with a main pot having a heating chamber and a percolator tube projecting upwardly from said chamber, of a coffee container having an overflow tube adapted to surround said percolator tube when the parts are assembled, a deflecting plate mounted on said overflow tube and arranged to engage the upper end of said percolator tube, and a screen surrounding the upper end of said overflow tube below said deflecting plate.

3. In a percolator pot, the combination with a main pot, a heating chamber and a percolator tube projecting upwardly therefrom, of a coffee container having an overflow tube adapted to surround said percolator tube when the parts are assembled, a deflecting plate supported by said overflow tube and arranged to extend closely around the upper end of the percolator tube, and a removable screen supported upon said overflow tube and arranged to surround the upper end thereof below said deflecting plate, said screen being spaced away from said deflecting plate to provide an overflow passage between said parts.

4. In a percolator pot, the combination with a main pot having a heating chamber and a percolator tube extending upwardly from said chamber, of a coffee container having an overflow tube adapted to surround said percolator tube when the parts are assembled, a removable tubular member supported upon the upper end of said overflow tube and carrying a deflecting plate arranged to closely surround the upper end of the percolating tube, said member having overflow apertures, and a removable screen supported upon said tubular member and arranged to surround the upper end of said overflow tube and to overlie said apertures, said tubular member and screen being separable to facilitate cleaning.

5. In a percolator pot, the combination of a main pot having a heating chamber and a percolator tube, extending upwardly from said chamber, of a coffee container having an overflow tube arranged to form an overflow passage around said percolator tube when the parts are assembled and a screen supported by said overflow tube and projecting above the same and extending around the upper end of the percolator tube.

JAMES W. CHAPMAN.

Witnesses:
GEO. R. DIMOCK,
A. L. STETSON.